United States Patent
Faass et al.

(10) Patent No.: US 10,371,177 B2
(45) Date of Patent: Aug. 6, 2019

(54) DIAPHRAGM FOR PNEUMATIC CONTROLLER

(71) Applicant: HAMILTON SUNDSTRAND CORPORATION, Windsor Locks, CT (US)

(72) Inventors: Adam Faass, North Haven, CT (US); Robert DeFelice, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 196 days.

(21) Appl. No.: 15/185,112

(22) Filed: Jun. 17, 2016

(65) Prior Publication Data
US 2017/0363118 A1    Dec. 21, 2017

(51) Int. Cl.
*F15B 15/10*     (2006.01)
*F16K 31/126*    (2006.01)
*F16J 3/06*      (2006.01)

(52) U.S. Cl.
CPC .............. *F15B 15/10* (2013.01); *F16J 3/06* (2013.01); *F16K 31/126* (2013.01)

(58) Field of Classification Search
CPC ...................................................... F15B 15/10
See application file for complete search history.

(56) References Cited

U.S. PATENT DOCUMENTS

| | | | |
|---|---|---|---|
| 2,905,199 A * | 9/1959 | Cook | F15B 15/10 92/100 |
| 3,026,909 A | 3/1962 | Boteler | |
| 3,310,280 A | 3/1967 | Boteler | |
| 4,014,514 A | 3/1977 | Priese et al. | |
| 4,050,358 A * | 9/1977 | Humberstone | F16J 3/02 264/258 |
| 4,067,544 A * | 1/1978 | Vetter | B66F 3/35 254/93 HP |
| 5,836,233 A | 11/1998 | Rumsey | |
| 2003/0167917 A1 | 9/2003 | Ball et al. | |

FOREIGN PATENT DOCUMENTS

| | | |
|---|---|---|
| EP | 1481170 B1 | 6/2006 |
| EP | 2153986 A2 | 2/2010 |
| EP | 2363610 A1 | 9/2011 |

OTHER PUBLICATIONS

European Search Report Issued in EP Application No. 17176337.8, dated Oct. 20, 2017, 10 Pages.

* cited by examiner

*Primary Examiner* — F Daniel Lopez
(74) *Attorney, Agent, or Firm* — Cantor Colburn LLP

(57) ABSTRACT

A pneumatic controller includes a housing, a piston located in the housing and movable therein and a diaphragm located at the piston to isolate a first chamber of the pneumatic controller from a second chamber of the pneumatic controller. The diaphragm includes a first diaphragm surface, a diaphragm opening extending through the diaphragm, and a fabric reinforcing layer to strengthen the diaphragm. A diaphragm to isolate a first chamber of a pneumatic controller from a second chamber of a pneumatic controller includes a first diaphragm surface, a diaphragm opening extending through the diaphragm, and a fabric reinforcing layer to strengthen the diaphragm.

13 Claims, 3 Drawing Sheets

DIAPHRAGM FOR PNEUMATIC CONTROLLER

BACKGROUND

The subject matter disclosed herein relates to pneumatic systems, and more particularly to pneumatic controllers.

Pneumatic controllers typically are configured with a housing including two abutting chambers, separated from each other via a diaphragm, diaphragm plate and a piston. The diaphragm and piston are movable in the housing in response to pressure differences between the two chambers. A spring is located in the housing to bias the position if the piston, and is supported by a spring seat positioned in the housing. A bolt extends through the spring seat and piston to fix the relationship of the components. To aid in sealing between the chambers, a diaphragm is positioned between the spring seat and the piston.

Over the service life of the controller, the bolt stack up between the diaphragm, piston and spring seat can loosen as a result of the diaphragm compressing. This compression also known as "creep" of the diaphragm, results in a calibration of the controller shifting to outside of predetermined acceptable calibration limits. To prevent the diaphragm creep, a collar is incorporated in the bolt stack, extending through a diaphragm opening, through which the bolt also extends. To accommodate the collar, however, the diaphragm opening is enlarged, resulting in a loss of strength of the diaphragm. The loss of strength can lead to rupture of the diaphragm and loss of function of the controller.

SUMMARY

In one embodiment, a pneumatic controller includes a housing, a piston located in the housing and movable therein and a diaphragm located at the piston to isolate a first chamber of the pneumatic controller from a second chamber of the pneumatic controller. The diaphragm includes a first diaphragm surface, a diaphragm opening extending through the diaphragm, and a fabric reinforcing layer to strengthen the diaphragm.

Additionally or alternatively, in this or other embodiments the pneumatic controller includes a spring seat positioned at the piston and a spring operably connected to the spring seat to bias a position of the piston. The diaphragm is located between the piston and the spring seat.

Additionally or alternatively, in this or other embodiments the fabric reinforcing layer is disposed at the first diaphragm surface.

Additionally or alternatively, in this or other embodiments the fabric reinforcing layer covers an entirety of the first diaphragm surface.

Additionally or alternatively, in this or other embodiments a second diaphragm surface is located opposite the first diaphragm surface. A fabric reinforcing layer is positioned at the second diaphragm surface.

Additionally or alternatively, in this or other embodiments a second diaphragm surface is located opposite the first diaphragm surface and the fabric reinforcing layer is positioned between the first diaphragm surface and the second diaphragm surface.

Additionally or alternatively, in this or other embodiments two fabric reinforcing layers are located between the first diaphragm surface and the second diaphragm surface.

Additionally or alternatively, in this or other embodiments the two fabric reinforcing layers are of unequal size.

Additionally or alternatively, in this or other embodiments the fabric reinforcing layer is integrally molded into the diaphragm.

Additionally or alternatively, in this or other embodiments the fabric reinforcing layer is formed from a high temperature resistant material.

In another embodiment. a diaphragm to isolate a first chamber of a pneumatic controller from a second chamber of a pneumatic controller includes a first diaphragm surface, a diaphragm opening extending through the diaphragm, and a fabric reinforcing layer to strengthen the diaphragm.

Additionally or alternatively, in this or other embodiments the fabric reinforcing layer is located at the first diaphragm surface.

Additionally or alternatively, in this or other embodiments the fabric reinforcing layer covers an entirety of the first diaphragm surface.

Additionally or alternatively, in this or other embodiments the fabric reinforcing layer covers between 25% and 75% of the first diaphragm surface.

Additionally or alternatively, in this or other embodiments a second diaphragm surface is located opposite the first diaphragm surface, and a fabric reinforcing layer is located at the second diaphragm surface.

Additionally or alternatively, in this or other embodiments a second diaphragm surface is located opposite the first diaphragm surface and the fabric reinforcing layer is located between the first diaphragm surface and the second diaphragm surface.

Additionally or alternatively, in this or other embodiments two fabric reinforcing layers are located between the first diaphragm surface and the second diaphragm surface.

Additionally or alternatively, in this or other embodiments the fabric reinforcing layer is formed from a high temperature resistant material.

Additionally or alternatively, in this or other embodiments the fabric reinforcing layer is integrally molded into the diaphragm.

In yet another embodiment, a pneumatic controller includes a housing, a piston located in the housing and movable therein, a spring seat located at the piston, a spring operably connected to the spring seat to bias a position of the piston, a bolt extending through the spring seat into the piston to secure the spring seat to the piston, and a diaphragm interposed between the piston and the spring seat to isolate a first chamber of the pneumatic controller from a second chamber of the pneumatic controller. The diaphragm includes a first diaphragm surface, a diaphragm opening extending through the diaphragm, the bolt extending through the diaphragm opening, and a fabric reinforcing layer to strengthen the diaphragm. A collar is located at the spring seat and extends through the diaphragm opening.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
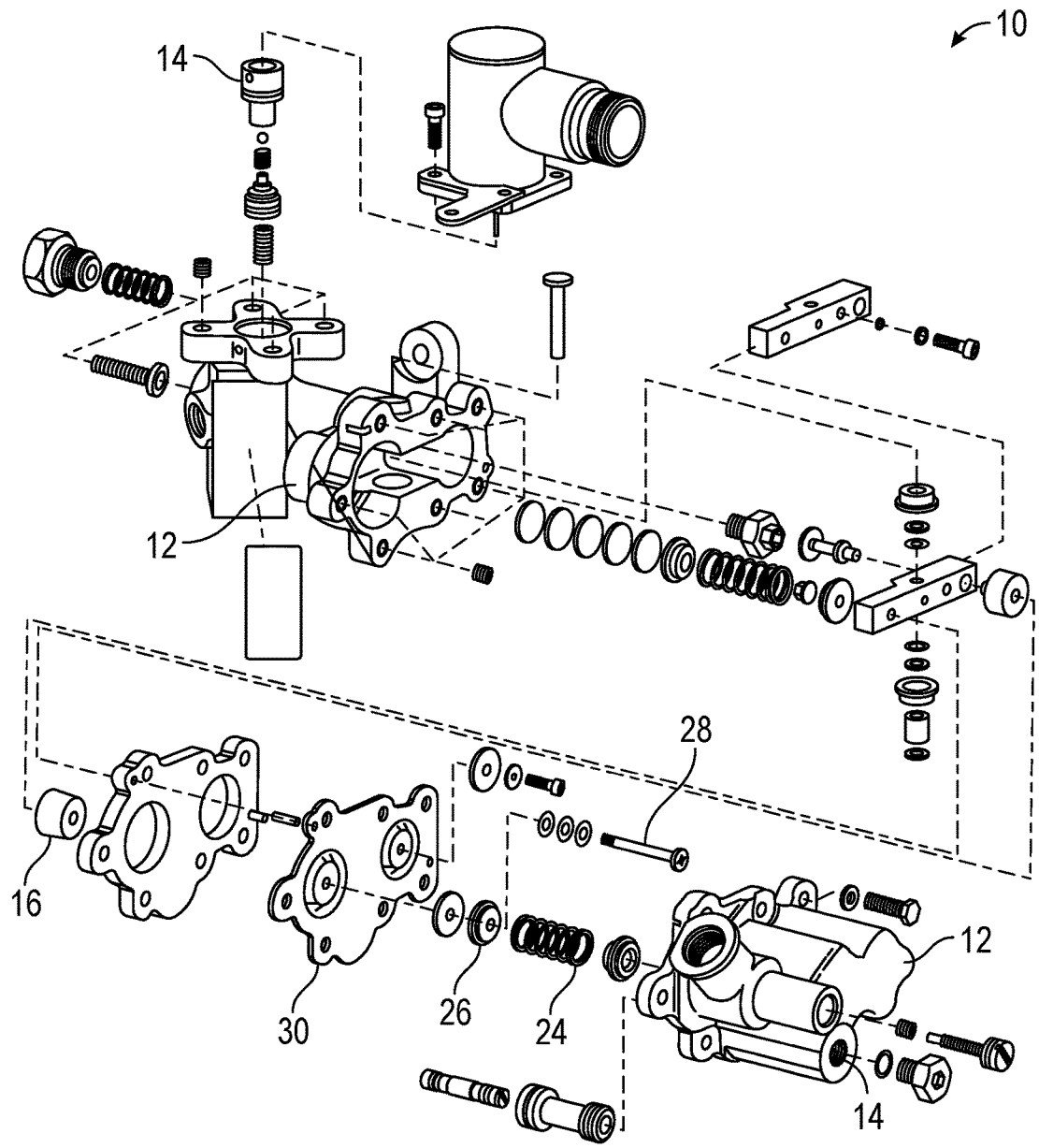
FIG. 1 is an exploded view of an embodiment of a pneumatic controller.
Figure 2:
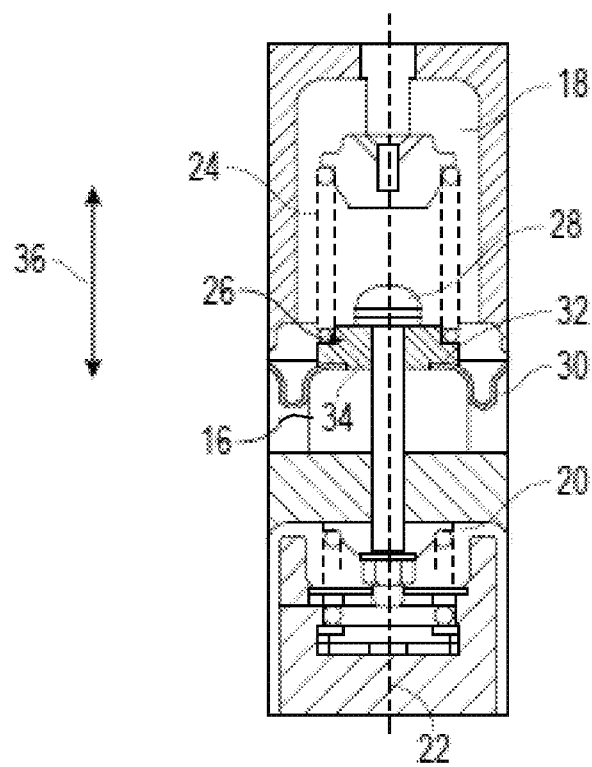
FIG. 2 is a cross-sectional view of an embodiment of a bolt stack of a pneumatic controller.

Shown in FIG. 1 is an exploded view of an embodiment of a pneumatic controller 10. The controller 10 includes a housing 12 with pneumatic ports 14 to pressurize an interior of the housing 12. A piston 16 is located in the housing 12, and a diaphragm 30, dividing the interior into a first chamber 18 and a second chamber 20, as shown in FIG. 2. The piston 16 is movable in the housing 12 in response to a pressure difference between a first chamber 18 pressure and a second chamber 20 pressure.

Referring to FIG. 2, the piston 16 is biased in a direction along a piston axis 22 by a biasing member, for example, a spring 24. The spring 24 is interactive with the piston 16 via a spring seat 26 located between the spring 24 and the piston 16. The spring seat 26 is fixed to the piston 16 via a bolt 28 or other mechanical fastener, such as a screw or rod extending through both the piston 16 and the spring seat 26.

A diaphragm 30 is positioned between the spring seat 26 and the piston 16 to isolate the first chamber 18 from the second chamber 20. The diaphragm 30 is formed from, for example, silicone, an elastomer material such as a rubber, or other material such that the diaphragm seals to the housing 12 to isolate the first chamber 18 from the second chamber 20. The diaphragm 30 includes a diaphragm opening 32 through which the bolt 28 extends. In some embodiments, a collar 34 is located at the diaphragm opening 32 to prevent movement or "creep" of the diaphragm 30 in an axial direction 36 in the event that the forces retaining the spring seat 26 at the piston 16 reduce over the service life of the controller 10. For example, the bolt 28 may loosen due to creep resulting in a reduction of retention forces. In some embodiments, such as shown in FIG. 2, the collar 34 is integral to the spring seat 26.

Figure 3:
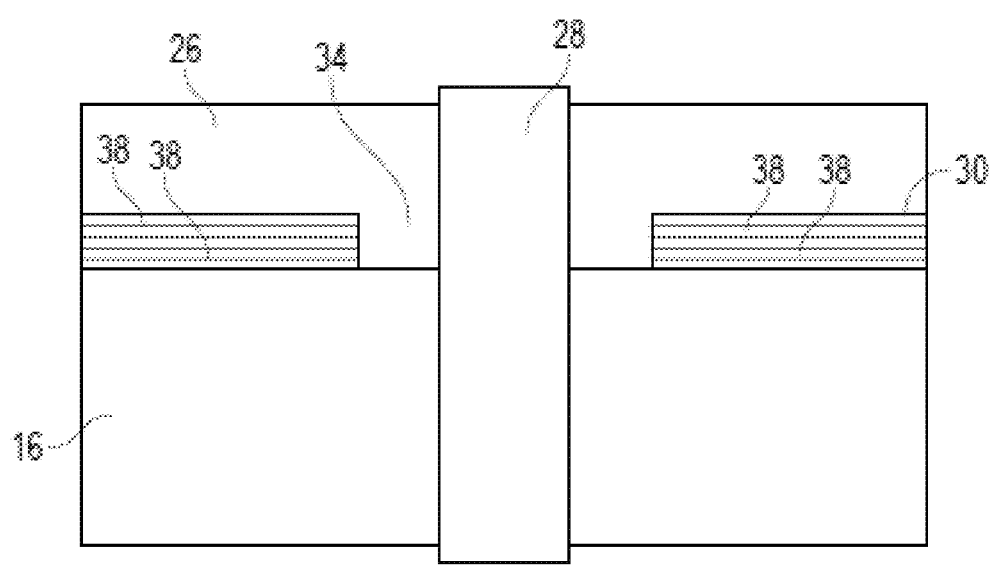
FIG. 3 is another cross-sectional view of a bolt stack of a pneumatic controller including a diaphragm.

Referring now to FIG. 3, the diaphragm 30 is reinforced to improve strength of the diaphragm 30, increasing a burst pressure of the diaphragm 30 while still accommodating the collar 34. The reinforcement is in the form of one or more reinforcing fabric layers 38 located at the diaphragm 30. In some embodiments, the one or more fabric layers 38 are formed from a high temperature resistant fabric such as Nomex®, for use in applications where the operating temperature exceeds 300 degrees Fahrenheit. As shown in FIG. 3, in some embodiments, the one or more fabric layers 38 are located between the diaphragm 30 and the spring seat 26, and/or between the diaphragm 30 and the piston 16. The one or more fabric layers 38 are integrally molded into the diaphragm 30 or are alternatively secured to the diaphragm by, for example, an adhesive bond or other means. In the embodiment of FIG. 3, a first fabric layer 38 extends through the diaphragm in its entirety, while a second fabric layer 38 is an annular piece located at the spring seat 26.

Figure 4:
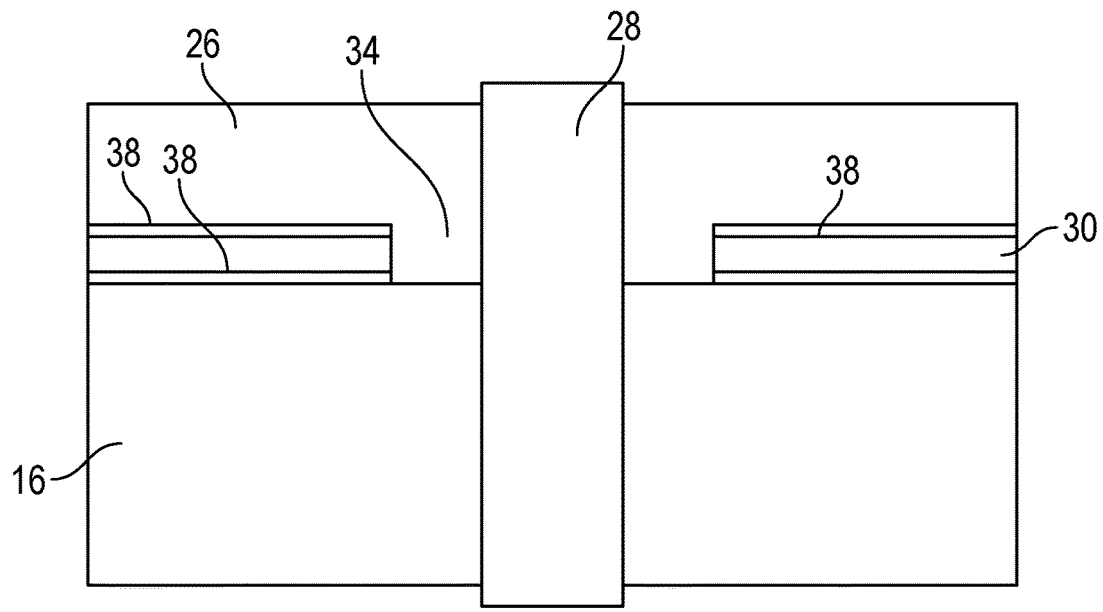
FIG. 4 is a cross-sectional view of another embodiment of a bolt stack of a pneumatic controller including a diaphragm.
Figure 5:
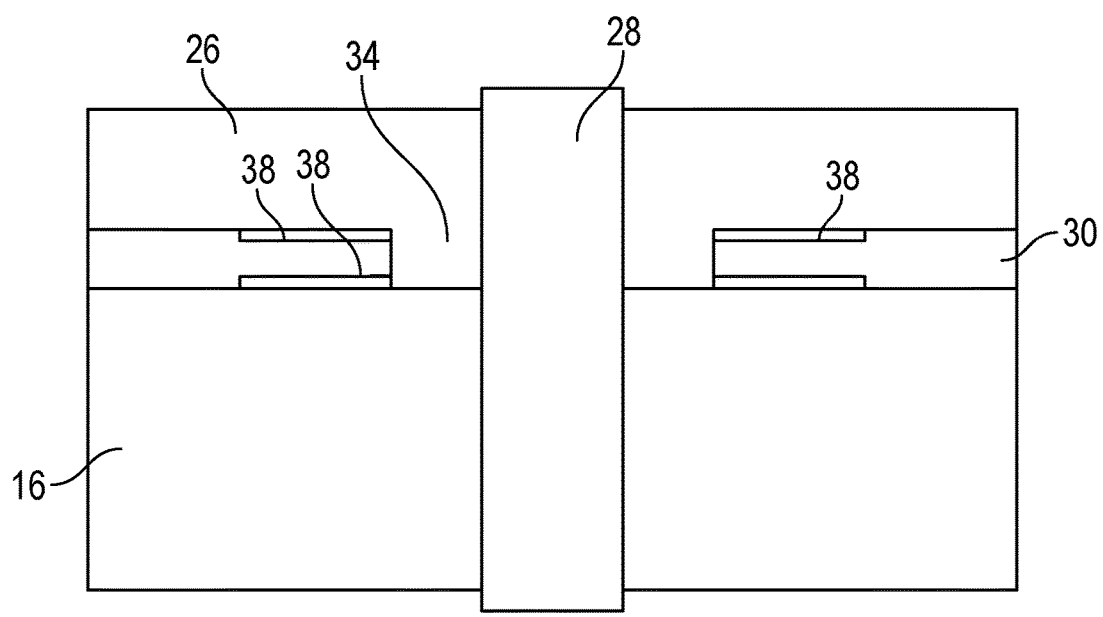
FIG. 5 is a cross-sectional view of yet another embodiment of a bolt stack of a pneumatic controller including a diaphragm.

Further, in some embodiments, such as shown in FIG. 4, the fabric layers 38 may be located at outer surfaces of the diaphragm 30, and may completely cover the diaphragm 30 surface, while in other embodiments, such as shown in FIG. 5, the fabric layer 38 may only partially cover the diaphragm 30 surface. For example, in some embodiments the fabric layer 38 covers a portion of the diaphragm 30 surface centered on the diaphragm opening 32 corresponding to between 25% and 75% of the diaphragm 30 surface area.

The reinforcement fabric layers 38 located at the diaphragm 30 strengthen the diaphragm to aid in resisting rupture of the diaphragm. Further, the fabric layers 38 add creep resistance to the diaphragm, thus aiding the pneumatic controller in staying within predetermined calibration limits during its operational life.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A pneumatic controller, comprising:
    a housing;
    a piston disposed in the housing and movable therein;
    a diaphragm disposed at the piston to isolate a first chamber of the pneumatic controller from a second chamber of the pneumatic controller, the diaphragm including:
        a first diaphragm surface;
        a diaphragm opening extending through the diaphragm;
        two fabric reinforcing layers to strengthen the diaphragm; and
        a second diaphragm surface opposite the first diaphragm surface, the two fabric reinforcing layers disposed between the first diaphragm surface and the second diaphragm surface;
        wherein the two fabric reinforcing layers are of unequal size.

2. The pneumatic controller of claim 1, further comprising:
    a spring seat disposed at the piston; and
    a spring operably connected to the spring seat to bias a position of the piston;
    wherein the diaphragm is disposed between the piston and the spring seat.

3. The pneumatic controller of claim 1, wherein at least one fabric reinforcing layer of the two fabric reinforcing layers are disposed at the first diaphragm surface.

4. The pneumatic controller of claim 3, wherein the at least one fabric reinforcing layer covers an entirety of the first diaphragm surface.

5. The pneumatic controller of claim 3, further comprising at least another fabric reinforcing layer of the two fabric reinforcing layers disposed at the second diaphragm surface.

6. The pneumatic controller of claim 1, wherein at least one fabric reinforcing layer of the two fabric reinforcing layers are integrally molded into the diaphragm.

7. The pneumatic controller of claim 1, wherein the two fabric reinforcing layers are formed from a high temperature resistant material.

8. A diaphragm to isolate a first chamber of a pneumatic controller from a second chamber of a pneumatic controller comprising:
    a first diaphragm surface;

a diaphragm opening extending through the diaphragm; and two fabric reinforcing layers to strengthen the diaphragm; and a second diaphragm surface opposite the first diaphragm surface, the two fabric reinforcing layers disposed between the first diaphragm surface and the second diaphragm surface;

wherein the two fabric reinforcing layers are of unequal size;

wherein at least one fabric reinforcing layer of the two fabric reinforcing layers is disposed at the first diaphragm surface; and wherein the at least one fabric reinforcing layer covers less than 75% of the first diaphragm surface.

9. The diaphragm of claim 8, wherein the at least one fabric reinforcing layer covers between 25% and 75% of the first diaphragm surface.

10. The diaphragm of claim 8, further comprising at least another fabric reinforcing layer of the two fabric reinforcing layers disposed at the second diaphragm surface.

11. The diaphragm of claim 8, wherein the at least one fabric reinforcing layer of the two fabric reinforcing layers is formed from a high temperature resistant material.

12. The diaphragm of claim 8, wherein the at least one fabric reinforcing layer of the two fabric reinforcing layers is integrally molded into the diaphragm.

13. A pneumatic controller, comprising:

a housing;

a piston disposed in the housing and movable therein;

a spring seat disposed at the piston;

a spring operably connected to the spring seat to bias a position of the piston;

a bolt extending through the spring seat into the piston to secure the spring seat to the piston;

a diaphragm interposed between the piston and the spring seat to isolate a first chamber of the pneumatic controller from a second chamber of the pneumatic controller, the diaphragm including:

a first diaphragm surface;

a diaphragm opening extending through the diaphragm, the bolt extending through the diaphragm opening; and two fabric reinforcing layers to strengthen the diaphragm; and a second diaphragm surface opposite the first diaphragm surface, the two fabric reinforcing layers disposed between the first diaphragm surface and the second diaphragm surface;

wherein the two fabric reinforcing layers are of unequal size; and a collar disposed at the spring seat and extending through the diaphragm opening.

* * * * *